(No Model.)

T. R. FERRALL.
ANTI-FRICTIONAL BEARING.

No. 279,552. Patented June 19, 1883.

Witnesses
Henry Chadbourn.
Geo. H. Thompson.

Inventor
Thomas R. Ferrall
by Alban Andrew
his atty

United States Patent Office.

THOMAS R. FERRALL, OF BOSTON, MASSACHUSETTS.

ANTI-FRICTIONAL BEARING.

SPECIFICATION forming part of Letters Patent No. 279,552, dated June 19, 1883.

Application filed March 5, 1883. (No model.)

*To all whom it may concern:*

Be it known that I, THOMAS R. FERRALL, a citizen of the United States, residing at Boston, in the county of Suffolk and State of Massachusetts, have invented certain new and useful Improvements in Anti-Frictional Bearings; and I do hereby declare that the same are fully described in the following specification and illustrated in the accompanying drawings.

This invention relates to improvements in anti-frictional bearings, and more particularly to improvements on the patent granted to me January 31, 1882, No. 252,872, in which a shell containing rollers with cylindrical end recesses was used combined with regulators having cylindrical side projections adapted to fit loosely in the recesses in the end of the rollers. In said patent the regulators were provided with radial projections adapted to serve as stops against annular collars or flanges on the inside of the shell, so as to prevent the rollers from moving endwise. By making the shell with such internal collars or flanges it became necessary to bend the radial projections on the regulators to admit of their being introduced into the shell, and to straighten them after being put in place within the shell, thus bending said projections twice in making a bearing, by which operation they were liable to get broken, besides requiring skilled labor to perform such an operation. In making bearings of this kind it is advantageous to have as many radial projections on the regulators as there are rollers, or preferably more than three; but when such projections had to be bent before being inserted and straightened after being put into the shell, it was found objectionable to have more than three such projections, on account of the extra labor required in so manipulating said regulator projections.

In my present invention I have so constructed the shell that the regulators, with their radial projections, may be inserted into the shell without bending them, as will now be more fully shown and described, reference being had to the accompanying drawings, where—

Figure 1:
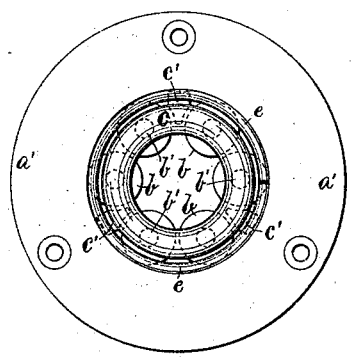
Figure 2:
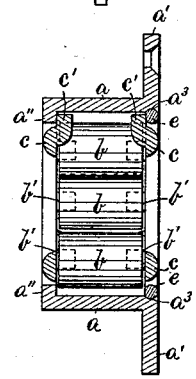
Figure 3:
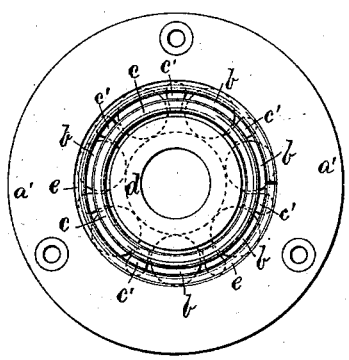
Figure 4:
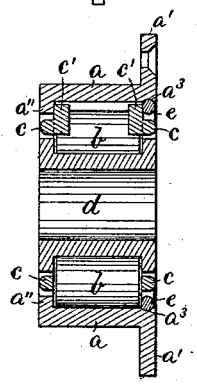

Figure 1 represents an end elevation of my improved bearing, and Fig. 2 represents a longitudinal section of the same. Fig. 3 represents an end elevation of the improved bearing with a centrally-bored-out flanged sleeve, and Fig. 4 represents a longitudinal section of Fig. 3.

Similar letters refer to similar parts wherever they occur on the different parts of the drawings.

$a$ represents the cylindrical shell, with its external flange, $a'$, and internal stop-flange, $a''$, as usual.

$b\ b\ b$ represent the cylindrical anti-frictional rollers, with cylindrical end recesses, $b'\ b'\ b'$. (Shown in dotted lines in Fig. 2.)

$c\ c$ are the regulators, with their radial stop projections $c'\ c'$, as usual, and with cylindrical projections adapted to rest in the end recesses of the rollers $b\ b$, as shown and described in my patent of January 31, 1882.

$d$ in Figs. 3 and 4 represents the cylindrical flanged central sleeve, arranged in a manner and for the purpose as shown in my aforesaid patent. The improved bearing may be made with or without such central sleeve, $d$, without departing from the spirit of my invention. One end of the shell $a$ is provided with an internal groove, $a^3$, as shown in Figs. 2 and 4, and in said groove is laid the split-wire ring $e$, which is made expansive, so that after the regulators and rollers have been introduced in place within the shell $a$ the wire ring $e$ is inserted into and expanded in place in the internal groove, $a^3$, and when in place it may be further secured by means of soldering it to the shell, if so desired; but this is not absolutely necessary, as it may be held in place by its own elastic or expansive property. It will thus be seen that the said detachable and expansive ring $e$ serves, with the internal flange, $a''$, as stops to prevent the regulators from moving endwise, and by its use the regulators may be introduced into the cylindrical shell $a$ without bending its radial projections, and the bearing can thus be made more durable and with less skilled labor as compared with the manner shown in my aforesaid patent. The shell $a$ may be provided with a second internal groove and its detachable expansive stop-wire in place of the internal flange $a''$; but I prefer to use such a flange in one end and the groove $a^3$, with its detachable and expansive wire ring $e$, in the other, as shown in Figs. 2 and 4.

By making the sleeve $a$ with one end open and of the same internal diameter as the main part, I am enabled to bore out the shell at one operation with a suitable tool or reamer, and at the same time cut the groove $a^3$ for the reception of the expansive stop-wire ring $e$, as described; and by this my improved construction I am enabled to produce a very strong and durable solid box-roller bushing, which ordinarily has to be made in two or more parts with double outside caps or flanges.

Having thus fully described the nature, construction, and operation of my invention, I wish to secure by Letters Patent and claim—

1. The herein-described solid shell $a$ for anti-frictional rollers, having one or more internal grooves, $a^3$, and stop-ring $e$, arranged as stops for the regulators $c\,c$ and their projections $c'\,c'$, as and for the purpose set forth.

2. The shell $a$, with its internal flange, $a''$, groove $a^3$, and stop-ring $e$, combined with the anti-frictional rollers $b\,b'$, and regulators $c\,c$, with their radial projections $c'\,c'$, and cylindrical projections bearing in the ends of rollers $b\,b'$, as described.

3. In combination, the shell $a$, internal flange, $a'$, groove $a^3$, stop-ring $e$, rollers $b\,b'$, regulators $c\,c'$, and cylindrical flanged central sleeve, $d$, as and for the purpose set forth.

In testimony whereof I have affixed my signature in presence of two witnesses.

THOMAS R. FERRALL.

Witnesses:
ALBAN ANDRÉN,
GEO. H. THOMPSON.